(12) United States Patent
Rajagopalan

(10) Patent No.: US 6,486,250 B1
(45) Date of Patent: Nov. 26, 2002

(54) GOLF BALL COMPOSITIONS COMPRISING SAPONIFIED POLYMER AND POLYAMIDE BLENDS

(75) Inventor: Murali Rajagopalan, South Dartmouth, MA (US)

(73) Assignee: Acushnet Company, Fairhaven, MA (US)

( * ) Notice: Subject to any disclaimer, the term of this patent is extended or adjusted under 35 U.S.C. 154(b) by 6 days.

(21) Appl. No.: 09/607,349

(22) Filed: Jun. 30, 2000

Related U.S. Application Data

(63) Continuation-in-part of application No. 09/215,370, filed on Dec. 18, 1998, now Pat. No. 6,121,384, which is a division of application No. 08/978,510, filed on Nov. 25, 1997, now Pat. No. 5,869,578, which is a continuation of application No. 08/560,763, filed on Nov. 21, 1995, now abandoned, which is a continuation-in-part of application No. 08/815,659, filed on Mar. 13, 1997, now Pat. No. 6,187,864.

(51) Int. Cl.[7] .......................... A63B 37/12; A63B 37/00; C08L 77/00; C08L 33/06
(52) U.S. Cl. .......................... 524/431; 524/440; 525/66; 525/179; 525/183; 473/354; 473/355; 473/365; 473/373; 473/374; 473/377; 473/385
(58) Field of Search .................................. 524/431, 440; 525/66, 179, 183; 473/354, 355, 365, 373, 374, 377, 378, 385

(56) References Cited

U.S. PATENT DOCUMENTS

| | | |
|---|---|---|
| 3,264,272 A | 8/1966 | Rees .......................... 260/78.5 |
| 3,819,768 A | 6/1974 | Molitor .................. 260/897 B |
| 3,870,841 A | 3/1975 | Makowski et al. .... 260/23.7 R |
| 3,926,891 A | 12/1975 | Gross et al. ............ 260/29.6 E |
| 3,970,626 A | 7/1976 | Hurst et al. ......... 260/29.6 WB |
| 4,102,876 A | 7/1978 | Brenner et al. ............... 526/19 |
| 4,105,709 A * | 8/1978 | Iwami |
| 4,234,184 A | 11/1980 | Deleens et al. |
| 4,255,540 A | 3/1981 | Weiss .......................... 525/332 |
| 4,274,637 A | 6/1981 | Molitor |
| 4,323,247 A | 4/1982 | Keches et al. .......... 273/235 R |
| 4,431,193 A | 2/1984 | Nesbitt .................... 273/235 R |
| 4,473,665 A | 9/1984 | Martini-Vvedensky et al. |
| 4,526,375 A | 7/1985 | Nakada .................. 273/235 R |
| 4,638,034 A | 1/1987 | McClain ...................... 525/369 |
| 4,801,649 A | 1/1989 | Statz |
| 4,840,982 A | 6/1989 | Campbell et al. |
| 4,858,924 A | 8/1989 | Saito et al. |
| 4,884,814 A | 12/1989 | Sullivan .................. 273/235 R |
| 4,911,451 A | 3/1990 | Sullivan et al. ......... 273/235 R |
| 4,919,434 A | 4/1990 | Saito |
| 4,956,438 A | 9/1990 | Ruetman et al. ............... 528/60 |
| 4,986,545 A | 1/1991 | Sullivan |
| 5,098,105 A | 3/1992 | Sullivan |
| 5,155,157 A | 10/1992 | Statz et al. |
| 5,160,674 A | 11/1992 | Colton et al. |
| 5,218,057 A | 6/1993 | Kurkov et al. ............... 525/369 |
| 5,244,969 A | 9/1993 | Yamada |
| 5,253,871 A | 10/1993 | Viollaz |
| 5,321,089 A | 6/1994 | Cadorniga et al. |
| 5,324,783 A | 6/1994 | Sullivan ...................... 525/196 |
| 5,330,837 A | 7/1994 | Sullivan et al. |
| 5,334,673 A | 8/1994 | Wu |
| 5,359,000 A | 10/1994 | Hamada et al. |
| 5,427,377 A | 6/1995 | Maruoka |
| 5,484,870 A | 1/1996 | Wu |
| 5,508,351 A | 4/1996 | Horiuchi et al. |
| 5,554,698 A | 9/1996 | Wang et al. |
| 5,556,098 A | 9/1996 | Higuchi et al. |
| 5,679,745 A | 10/1997 | Hamada et al. ............. 525/195 |
| 5,692,974 A | 12/1997 | Wu et al. .................... 473/377 |
| 5,730,664 A * | 3/1998 | Asakura |
| 5,830,087 A | 11/1998 | Sullivan et al. |
| 5,886,103 A | 3/1999 | Bellinger et al. |
| 5,981,654 A | 11/1999 | Rajagopalan |

FOREIGN PATENT DOCUMENTS

| | | |
|---|---|---|
| CA | 963380 | 2/1975 |
| EP | 148 632 A2 | 7/1985 |
| EP | 115 190 B1 | 9/1987 |
| GB | 2 164 342 A | 3/1986 |
| GB | 2 299 999 A | 10/1996 |
| JP | 6-192512 A | 7/1994 |
| JP | 9-658 A | 1/1997 |
| WO | WO 93/06137 | 4/1993 |
| WO | WO96/23009 | 8/1996 |

OTHER PUBLICATIONS

Ebewele; *Polymer Science and Technology* p. 182, 428.*
J.M. Willis et al., "Processing–Morphology Relationships of Compatibilized Polyolefin/Polyamide Blends", J. Materials Sci., vol. 26, pp. 4742–4750 (1991).
P. Rajagopalan et al., J. Polym. Sci. Pt. B, Polym. Physics, 33:495–503 (1995).
Advances in Urethan Ionomers, Technomic Publishing Co., Inc., H.X. Xiao and K.C. Frisch.

* cited by examiner

Primary Examiner—David J. Buttner
(74) Attorney, Agent, or Firm—Swidler Berlin Shereff Friedman, LLP

(57) ABSTRACT

The present invention is directed to a golf ball and a to a process for forming a golf ball having least one layer, where the layer is formed of a saponified polymer/polyamide blend, having from about 1 to about 99 parts of at least one saponified polymer and from about 99 to 1 parts of at least one polyamide polymer, based on 100 parts by weight of the saponified polymer/polyamide blend. The layer may be foamed or unfoamed, and may form at least a portion of any of the cover, the core, or an intermediate layer situated between the cover and the core.

59 Claims, No Drawings

GOLF BALL COMPOSITIONS COMPRISING SAPONIFIED POLYMER AND POLYAMIDE BLENDS

This application is a continuation-in-part of U.S. application Ser. No. 08/815,659, filed on Mar. 13, 1997 now U.S. Pat. No. 6,187,864, and a continuation-in-part of U.S. application Ser. No. 09/215,370, filed on Dec. 18, 1998 now U.S. Pat. No. 6,121,384, which is a divisional of U.S. application Ser. No. 08/978,510, filed on Nov. 25, 1997, now U.S. Pat. No. 5,869,578, which is a continuation of U.S. application Ser. No. 08/560,763, filed on Nov. 21, 1995, now abandoned. Each of these applications is incorporated by reference herein in its entirety.

TECHNICAL FIELD

The present invention is directed to methods and compositions for forming at least one layer in a golf ball, and to golf balls, which comprise such a layer, having improved properties. In particular, the invention is directed to golf balls having a cover, a core, and, optionally, at least one intermediate layer situated between the cover and the core, where at least one of the cover or the core or the optional intermediate layer comprises a blend of at least one saponified polymer and at least one polyamide-containing polymer, and to methods of forming such golf balls.

BACKGROUND OF THE INVENTION

Three-piece, wound golf balls with balata covers are preferred by most expert golfers. These balls provide a combination of distance, high spin rate and control that is not available with other types of golf balls. However, balata is easily damaged in normal play and, thus, lacks the durability required by the average golfer. In contrast, amateur golfers typically prefer a solid, two-piece ball with an ionomer cover, which provides a combination of distance and durability. Because of the hard ionomer cover, these balls are almost impossible to cut, but also have a very hard "feel", which many golfers find unacceptable, and a lower spin rate, making these balls more difficult to draw or fade. The differences in the spin rate can be attributed to the differences in the composition and construction of both the cover and the core.

Consequently, a need exists for a golf ball composition which provides spin rates and a feel more closely approximating those of balata covered balls, while also providing as high or a higher degree of durability than that provided by the balls presently available or disclosed in the prior art. Golf ball manufacturers have attempted to produce golf ball covers that provide the spin rate of balata with the cut resistance of an ionomer by forming blends consisting essentially of hard ionomers with softer, nonionomer polymers to soften the golf ball and improve its feel and spin rate. However, this approach has proven to be difficult because the ionic character of ionomers imparts a highly polar nature to these materials. Therefore, ionomers and other non-ionic polymers, such as balata and polyolefin homopolymers, copolymers or terpolymers that do not contain ionic, acidic, basic or other polar pendant groups, have not been successfully blended for use in golf ball covers. These mixtures often have poor mechanical properties such as inferior tensile strength, impact strength and the like. Hence, the golf balls produced from these incompatible mixtures will have inferior golf ball properties such as poor durability and cut resistance on impact.

Saponification or hydrolysis of alkyl acrylate units in a crosslinkable polymer chain is disclosed by Gross in U.S. Pat. No. 3,926,891. In U.S. Pat. No. 3,970,626, Hurst discloses heating a mixture of an alkali metal hydroxide, a thermoplastic ethylene-alkyl acrylate copolymer and water to saponify the acrylate units and form an aqueous emulsion.

A different approach to saponification or hydrolysis of an ethylene-alkyl acrylate copolymer is disclosed by Kurkov in U.S. Pat. No. 5,218,057, in which the copolymer is mixed with an aqueous solution of an inorganic alkali metal base at a temperature sufficient for saponification to take place and at which the copolymer undergoes a phase change.

All of the prior saponification methods discussed above require that the polymer component be in contact with water, either by conducting the reaction in an aqueous medium or by adding an aqueous solution to the polymer. However, nonaqueous inorganic alkali metal base solutions, e.g., containing an alcohol or polyethylene glycol solvent, are disclosed by U.S. Pat. No. 5,554,698 to Wang et al., although aqueous solutions are disclosed to be preferred.

McClain, in U.S. Pat. No. 4,638,034, discloses a process whereby ethylene-acrylic acid copolymers or their ionomers are prepared from ethylene-alkyl acrylate copolymers by saponifying the latter in the melt with metal hydroxides to form an ionomer and a by-product, i.e., alkanol, then optionally acidifying the ionomer to form the free acid copolymer.

The processes disclosed by the Kurkov, McClain and Wang references, in particular, are incapable of providing optimal product quality since blending and saponifying in a single operation as taught by the subject references leads to rapid saponification, with a concurrent rapid increase in melt viscosity. Due to this rapid increase in viscosity, the resultant mixture is non-uniform and therefore the material properties of products made from this material are not consistent throughout the product. U.S. Pat. No. 5,869,578 to Rajagopalan, a patent that issued from one of the parent applications of the present invention, overcame the above deficiencies.

It is known that saponified polymers may be blended with ionomers. For example, U.S. Pat. No. 5,508,351 to Horiuchi et al. discloses a golf ball cover comprising a resin composition containing 10 to 80 wt. % of a partially saponified olefin/acrylate ester copolymer with the balance consisting of an ionomer. However, this reference does not disclose or even suggest the use of saponified polymer being blended with polyamide for a golf ball cover or intermediate or core layer compositions.

Saponified polymers of the present invention differ from prior art ionomers, inter alia, in that any pendant groups that are not modified by the saponification process are ester groups in contrast to the pendant carboxylic acid groups that remain after neutralization in prior art ionomers. The new composition can contain binary, ternary, or multi-component blends of metal cations used to neutralize the polymer. Such blends may be further combined with other polymers, such as SURLYN®, IOTEK® and IMAC® ionomers, to produce golf balls and golf ball covers with desirable properties. The golf ball composition can be used for both solid and wound construction balls.

It is also known that saponified polymers may be blended with polyamides. For example, U.S. Pat. No. 5,554,698 to Wang et al. discloses low-haze films and peelable seals formed from saponified α-olefin/α,β-ethylenically-unsaturated carboxylic acid ester copolymers which, optionally, may contain polyamide. However, this reference does not disclose or even suggest the use of saponified polymer/polyamide blends in golf balls, or that such blends could provide golf balls having improved properties.

U.S. Pat. No. 5,981,654 to Rajagopalan is directed to compositions and methods for making golf balls, wherein the composition comprises a substantially optical brightener-free nonionomer/polyamide polymer blend. U.S. Pat. No. 5,886,103 to Bellinger et al. discloses a golf ball with covers having a composition comprising a polyamide and an ionomer. Both the Rajagopalan '654 and the Bellinger '103 patents do not disclose the saponified polymer/polyamide blends of the present invention.

Numerous attempts have been made to replicate the performance of balata covered balls, some using polyamides as a component of a golf ball composition. Despite these numerous attempts, the golf ball compositions of the prior art generally suffer from low spin rates which makes them difficult to control near the greens. Further, such balls tend to have relatively poor "feel" as compared to the balata covered balls. Additionally, many of the prior art golf ball compositions are made with low flexural modulus ionomer resins which have improved spin and feel characteristics, but relatively low velocity, which results in shorter overall distance.

A need exists in the golf ball art for highly durable golf balls, which have improved performance, and may be tailored to have virtually any combination of feel and spin rate. The present invention provides such a golf ball.

SUMMARY OF THE INVENTION

The present invention is directed to a golf ball having at least one layer, where the layer is formed of a saponified polymer/polyamide blend, comprising from about 1 to about 99 parts of at least one saponified polymer and from about 99 to 1 parts of at least one polyamide polymer, based on 100 parts by weight of the saponified polymer/polyamide blend. The layer may further comprise up to about 20 parts per weight of at least one suitable compatibilizer, based on 100 parts by weight of the saponified polymer/polyamide blend. The layer may form a one piece ball or at least a portion of any of a cover layer, a core layer, or, optionally, at least one intermediate or mantle layer situated between the cover and the core. Typically the saponified polymer/polyamide blend has a hardness of at least 15 Shore A, a flexural modulus of at least 500 psi, and a specific gravity of at least 0.7. Preferably, a layer of a golf ball comprising the present invention has a flexural modulus of at least 500 to about 300,000 psi.

A golf ball comprising the present invention has an Atti compression of at least 50 and a coefficient of restitution of at least 0.7. Preferably, the Atti compression of the golf ball is at least 60 to about 100.

Golf balls in accordance with the invention preferably have a cover thickness of at least 0.03 inch to about 0.125 inch and at least 60 percent dimple coverage, and a core diameter of at least 0.5 to about 1.63 inches. Where the golf ball of the present invention further comprises at least one optional mantle or intermediate layer, the mantle or intermediate layer has a thickness of at least 0.02 inches.

Golf balls of the present invention preferably have a cover layer hardness of at least 40 Shore D to about 70 Shore D and a flexural modulus of at least 10,000 to about 100,000 psi, an intermediate layer hardness of at least 20 Shore D to about 70 Shore D and a flexural modulus of at least 500 to about 100,000 psi and a core layer hardness of at least 40 Shore A to about 70 Shore D and a flexural modulus of at least 500 to 150,000 psi. Any of the cover, the core or the center, or the at least one optional mantle or intermediate layer may comprise a density adjusting filler material to increase or decrease the density. The density adjusting filler material may be a metallic powder or a metallic oxide derivative. Preferably, the metallic powder is either titanium, tungsten or copper powder and the metallic oxide derivative is an oxide derivative of titanium, tungsten, copper or tin.

In addition, any of the cover, the core or the center, or the at least one optional mantle or intermediate layer may have a foamed structure. The at least one optional mantle or intermediate layer further comprises a wound tensioned elastomeric material, wherein the tensioned elastomeric material further comprises natural or synthetic elastomers or blends thereof. Preferably the synthetic elastomer is LYCRA. The center may be solid, fluid filled or hollow.

The saponified polymer component of this invention has a Shore D hardness of at least 15, as measured by ASTM method D-2240, a flexural modulus, as measured by ASTM method D-790, of at least 500 psi, preferably about 1000 psi to about 100,000 psi, a specific gravity of at least about 0.7, preferably about 0.75 to about 1, a dynamic shear storage modulus (G') at 23° C., as described in ASTM D 4092-90, ASTM D 5279-93, and ASTM D 4065-94, of at least $10^4$ dynes/cm$^2$, preferably about $10^6$ to about $10^1$ dynes/cm$^2$, and most preferably from $10^6$ to about $10^9$ dynes/cm$^2$, and a loss tangent (tan δ) of no more than about 1, preferably, no more than 0.1, and most preferably from about 0.001 to about 0.01 at 23° C.

The saponified polymer typically comprises a first olefinic, monomeric component having from 2 to 8 carbon atoms and a second monomeric component comprising an unsaturated carboxylic acid based acrylate class ester having from 4 to 22 carbon atoms and at least one ester group, wherein at least a portion of the at least one ester group has been saponified with an inorganic metal base. Useful inorganic metal bases include but are not limited to metal bases comprising at least one metallic cation, such as lithium, sodium, potassium, cesium, magnesium, calcium, barium, manganese, copper, zinc and aluminum, and at least one anion, such as hydroxide, alkoxide, acetate, carbonate, bicarbonate, oxide, formate and nitrate.

Typically, the first monomeric component is an α-olefin monomer having a terminal point of unsaturation, and may be of the formula:

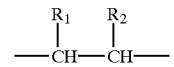

where $R_1$ is hydrogen or an alkyl group and $R_2$ is hydrogen, lower alkyl including $C_1$–$C_5$, carbocyclic or aromatic. Preferably, the first monomeric component is ethylene.

Typically, the first monomeric component comprises from about 1 to about 99 percent by weight of the total polymer weight, preferably from about 10 to about 95 percent by weight of the total polymer weight and most preferably from about 10 to about 70 percent by weight of the total polymer weight.

The second monomeric component is typically an unsaturated acrylate class ester having the formula:

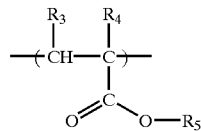

where $R_3$ is hydrogen or an alkyl group; $R_4$ is hydrogen, lower alkyl including $C_1$–$C_5$, carbocyclic or aromatic; $R_5$ is selected from the group consisting of $C_nH_{2n+1}$, for n=1 to 18 and phenyl, in which from 0 to 5 H within $R_5$ can be replaced by substituents selected from the group consisting of COOH, $SO_3H$, $NH_2$, succinic anhydride and their salts or $R_5$ can be replaced by substituents selected from the group consisting of F, Cl, Br, I, OH, SH, epoxy, silicone, lower alkyl esters, lower alkyl ethers and aromatic rings, wherein optionally $R_4$ and $R_5$ can be combined to form a bicyclic ring. Typically, the second monomeric component comprises from about 99 to about 1 percent by weight of the total polymer weight, preferably, from about 90 to about 5 percent by weight of the total polymer weight and most preferably, from about 90 to about 30 percent by weight of the total polymer weight.

The saponified polymer may also comprise a third monomeric component. Useful third monomeric components include, but are not limited to, carbon monoxide, sulfur dioxide, an anhydride monomer, an unsaturated monocarboxylic acid, an olefin having from 2 to 8 carbon atoms and a vinyl ester or a vinyl ether of an alkyl acid having from 4 to 21 carbon atoms. Preferred third monomeric components include monomers of formula:

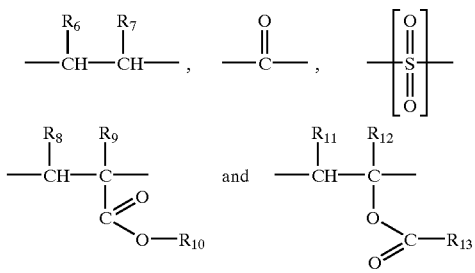

wherein:
- $R_6$, $R_7$, $R_8$, $R_{11}$ are independently hydrogen, lower alkyl including $C_1$–$C_5$, carbocyclic or aromatic;
- $R_9$ and $R_{12}$ are independently hydrogen, lower alkyl including $C_1$–$C_5$;
- $R_{10}$ is hydrogen, or is selected from the group consisting of $C_nH_{2n+1}$, for n=1 to 18 and phenyl, in which from 0 to 5 H within $R_{10}$ can be replaced by substituents selected from the group consisting of COOH, $SO_3H$, $NH_2$ and their salts or $R_{10}$ can be replaced by substituents selected from the group consisting of F, Cl, Br, I, OH, SH, silicon, lower alkyl esters, lower alkyl ethers and aromatic rings;
- $R_{13}$ is hydrogen, or is selected from the group consisting of $C_nH_{2n+1}$ for n=1 to 18 and phenyl, in which from 0 to 5 H within $R_{13}$ can be replaced by substituents selected from the group consisting of COOH, $SO_3H$, $NH_2$ and their salts or $R_{13}$ can be replaced by substituents selected from the group consisting of F, Cl, Br, I, OH, SH, silicon, lower alkyl esters, lower alkyl ethers and aromatic rings, wherein optionally $R_{12}$ and $R_{13}$ can be combined to form a bicyclic ring.

Typically, the third monomeric component comprises up to about 49 percent by weight of the total polymer weight of the saponified polymer.

The present invention is also directed to a process for forming a golf ball, which comprises forming a polymer comprising a first olefinic monomeric component having from 2 to 8 carbon atoms and a second monomeric component comprising an unsaturated carboxylic acid based acrylate class ester having from 4 to 22 carbon atoms; applying a sufficient amount of heat to the polymer to convert the polymer to a substantially molten state; forming a mixture by adding an inorganic metal base to the molten polymer, such that the viscosity of the mixture remains substantially unchanged from the viscosity of the molten polymer; and saponifying the mixture to form a saponified polymer, where a sufficient amount of the inorganic metal base is added to the molten polymer in forming the mixture to obtain a degree of saponification of the polymer ranging between about 1 and 90 percent. At least one saponified polymer is then blended with at least one polyamide polymer to form a saponified polymer/polyamide blend which is used to form at least one layer of a golf ball. Preferably, the melting, mixing, and saponification all performed within an extruder.

The present invention is directed in an alternate embodiment to an additional process for forming a golf ball, which comprises forming a polymer comprising a first olefinic monomeric component having from 2 to 8 carbon atoms and a second monomeric component comprising an unsaturated carboxylic acid based acrylate class ester having from 4 to 22 carbon atoms; introducing the polymer into an inlet zone of an extruder comprising an inlet and at least one addition zone; melting and mixing the polymer in the inlet zone; passing the molten polymer through an addition zone within the extruder; forming a mixture at a first temperature above the melting temperature of the polymer and below a second temperature at which saponification takes place by adding a solution comprising at least one metal base into the molten polymer as it passes through the addition zone such that the viscosity of the mixture remains substantially unchanged from the viscosity of the molten polymer, followed by saponifying the mixture at the second temperature within the extruder to form a saponified polymer, where a sufficient amount of the inorganic metal base is added to the molten polymer in forming the mixture to obtain a degree of saponification of the polymer ranging between about 1 and 90 percent. At least one saponified polymer is then melt blended with at least one polyamide polymer using a batch or continuous process known in the art to form a saponified polymer/polyamide blend which is used to form at least one layer of a golf ball.

In either process, the process may further comprise adding to the polymer having a third monomeric component selected from carbon monoxide, sulfur dioxide, an anhydride monomer, an unsaturated monocarboxylic acid, an olefin having from 2 to 8 carbon atoms and a vinyl ester or a vinyl ether of an alkyl acid having from 4 to 21 carbon atoms.

A grafting agent may also be added to at least one of the saponified polymer or the polyamide to form a grafted polymer. The preferred grafting agent is an anhydride having the formula:

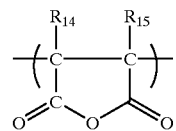

where $R_{14}$ and $R_{15}$ are the same or different and are selected from the group consisting of hydrogen, linear or branched chain alkyl and substituted or unsubstituted carboxylic groups.

The grafting agent is typically added in an amount of between about 1 to about 50 percent by weight, preferably from about 1 to about 25 percent by weight and most preferably from about 1 to about 15 percent by weight of the polymer.

Typical polyamide polymers include but are not limited to homopolymers, such as polyamide 6, polyamide 11, polyamide 12, polyamide 4,6, polyamide 6,6, polyamide 6,9, polyamide 6,10, polyamide 6,12 and mixtures thereof, and copolymers, such as polyamide 6/6,6, polyamide 6,6/6,10, polyamide 6/6,T, polyamide 6/6,6/6,10 and mixtures thereof. The preferred homopolyamides include polyamide 11 and polyamide 12.

Useful compatibilizers include olefinic block, random, and graft thermoplastics and oligomers, such as block, random, and graft thermoplastics based on homopolymers and copolymers of olefinic monomers with comonomers containing functionalized groups that enable the compatibilizer to be miscible with both the ionomer and the non-polar polymer or polar, but chemically different polymer. One purpose for the compatibilizer is to "reduce the interfacial tension" at the interface between the incompatible polymers. Functionalized polymers as compatibilizers useful in the invention include copolymers of olefinic monomers with comonomers containing functionalized groups of acids, esters, epoxies, isocyanates, hydroxys, anhydrides, amines, and thiols, e.g., copolymers of ethylene with alkylacrylates or glycidyl acrylate. Useful compatibilizers also include block copolymers such as copoly(ether ester), such as Du Pont's Hytrel, and copolyether-amide, such as Pebax. Other useful block copolymers include polysiloxanes, silicones, styrene-butadiene and hydrogenated styrene-butadiene block co-polymers. These block copolymers may also be functionalized with functional groups such as acids, esters, epoxies, isocyanates, hydroxys, anhydrides, amines, and thiols.

DETAILED DESCRIPTION OF THE INVENTION

As used herein, the terms "saponified polymer" and "saponified ionomer" refer to a polymer comprising at least one olefin and at least one unsaturated monomer that contains a pendant ester group, where at least some of the pendant ester groups have been saponified or hydrolyzed. Saponified polymers differ from prior art ionomers, inter alia, in that any pendant groups that are not modified by the saponification process are ester groups in contrast to the pendant carboxylic acid groups that remain after neutralization in prior art ionomers.

The term "polyamide polymer" or "polyamide" refers to a thermoplastic with repeating amide groups in the polymer chain. Polyamides can be comprised of a homopolymer, a copolymer, a block copolymer or a blend of two or more variations of any or all of the above types of polyamide polymers, as will be discussed in more detail below.

The term "saponified polymer/polyamide blend" as used herein, refers to any polymer blend that comprises at least one saponified polymer and at least one polyamide polymer.

As used herein with regard to a polymer blend, the term "compatible" refers to a blend of two or more polymers, having useful golf ball properties, that is homogeneous on a macroscopic scale. Compatible blends may be miscible (i.e., homogeneous on a microscopic scale), or at least partially immiscible (i. e., heterogeneous on a microscopic scale, but homogeneous on a macroscopic scale) and have a "reduced interfacial tension" at the polymer interface. The term "incompatible" refers to a mixture of at least two polymers that is heterogeneous on both a microscopic scale and a macroscopic scale, such that useful golf ball properties, such as durability, are lacking.

As used herein, the term "layer" includes any generally spherical portion of a golf ball or golf ball core, center (hollow, solid, fluid filled type), or intermediate layer, including one-piece cores and one-piece balls. An "intermediate layer" (also known as inner layer or mantle layer) is defined herein as a portion of the golf ball that occupies a volume between the cover and the core. Such an intermediate layer may be distinguished from a cover or a core by some difference in the property of the materials comprising the layers. Moreover, a "cover" or a "core" as these terms are used herein may comprise a single layer or a plurality of layers. An intermediate layer may be used, if desired, with a multilayer cover or a multilayer core, or with both a multilayer cover and a multilayer core. Therefore, an intermediate layer is also sometimes referred to in the art as an inner cover layer, as an outer core layer or as a mantle layer.

As used herein, the term "cover" means the outermost portion of a golf ball. A cover typically includes at least one layer and may contain indentations such as dimples and/or ridges. Paints and/or laminates are typically disposed about the cover to protect the golf ball during use thereof.

As used herein, the term "core" means the innermost portion of a golf ball, and may include one or more layers. When more than one layer is contemplated, the core includes a center and at least one mantle layer disposed thereabout. At least a portion of the core, typically the center, is solid or fluid. The core may also include one or more wound layers including at least one tensioned elastomeric material wound about the center. Preferably, the tensioned elastomeric material comprises natural or synthetic elastomers or blends thereof. Preferably, the synthetic elastomer is LYCRA.

As used herein, the term "Atti compression" is defined as the deflection of an object or material relative to the deflection of a calibrated spring, as measured with an Atti Compression Gauge, that is commercially available from Atti Engineering Corp. of Union City, N.J. Atti compression is typically used to measure the compression of a golf ball and/or a golf ball core.

As used herein, the term "coefficient of restitution" (COR) is calculated by dividing the rebound velocity of the golf ball by the incoming velocity when a golf ball is shot out of an air cannon. The COR testing is conducted over a range of incoming velocities and determined at an inbound velocity of 125 ft/s.

As used herein, the term "foamed" encompasses "conventional foamed" materials that have cells with an average diameter of greater than 100 $\mu$m and "microcellular" type materials that have closed cell sizes on the order of 2 to 25 $\mu$m. Examples of conventional foamed materials include those described in U.S. Pat. No. 4,274,637. Examples of microcellular closed cell foams include those foams disclosed in U.S. Pat. Nos. 4,473,665 and 5,160,674.

As used herein, the term "fluid" means a gas, liquid, gel, paste, or the like, or a combination thereof.

The term "about," as used herein in connection with one or more numbers or numerical ranges, should be understood to refer to all such numbers, including all numbers in a range.

The present invention relates to golf balls including at least one layer that comprises a compatible blend of at least one saponified polymer and one or more polyamide polymers, i.e., a saponified polymer/polyamide blend. As noted above, the layer may be in any of the core, the cover, or an intermediate layer situated between the cover and the core.

Typically, the blends of the invention comprise from about 1 to about 99 parts of the polyamide polymer and from about 99 to about 1 parts of the saponified polymer, preferably from about 5 to about 90 parts of at least one polyamide polymer and about 95 to about 10 parts of at least one saponified polymer, more preferably from about 10 to about 80 parts of at least one polyamide polymer and about 90 to about 20 parts of at least one saponified polymer based on 100 parts by weight of saponified polymer/polyamide blend.

As used herein with regard to saponified polymers and polyamide polymers, the phrase "branched or straight chain alkyl" means any substituted or unsubstituted acyclic carbon-containing compounds. Examples of alkyl groups include lower alkyl, for example, methyl, ethyl, n-propyl, iso-propyl, -butyl, iso-butyl or tert-butyl; upper alkyl, for example, octyl, nonyl, decyl and the like. The ordinary skilled artisan is familiar with numerous linear and branched alkyl groups, which are within the scope of the present invention.

In addition, such alkyl groups may also contain various substituents in which one or more hydrogen atoms has been replaced by a functional group. Functional groups include, but are not limited to hydroxyl, amino, carboxyl, sulfonic amide, ester, ether, phosphates, thiol, nitro, silane and halogen (fluorine, chlorine, bromine and iodine), to mention but a few.

As used herein, "substituted and unsubstituted carbocyclic" means cyclic carbon-containing compounds, including, but not limited to cyclopentyl, cyclohexyl, cycloheptyl, adamantyl and the like. Such cyclic groups may also contain various substituents in which one or more hydrogen atoms has been replaced by a functional group. Such functional groups include those described above and lower alkyl groups having from 1 to 28 carbon atoms.

As used herein, "substituted and unsubstituted aryl groups" refers to any functional group comprising a hydrocarbon ring having a system of conjugated double bonds, such as phenyl, naphthyl, anisyl, tolyl, xylenyl and the like. These aryl groups may also be substituted with any number of a variety of functional groups. In addition to the functional groups described above in connection with substituted alkyl groups and carbocyclic groups, functional groups on the aryl groups can include nitro groups.

Saponified polymers useful in the invention may be made, for example, from polymers of formula I:

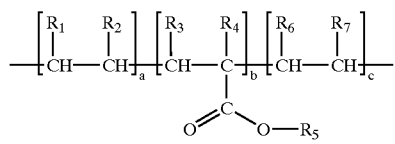
(I)

wherein:
R$_1$ is hydrogen, alkyl such as methyl, ethyl and branched or straight chain propyl, butyl, pentyl, hexyl, heptyl and octyl;
R$_2$, R$_4$, R$_6$, and R$_7$ are independently hydrogen, lower alkyl including C$_1$–C$_5$; carbocyclic or aromatic;
R$_3$ is hydrogen, alkyl such as methyl, ethyl and branched on straight chain propyl, butyl, pentyl, hexyl, heptyl and octyl;
R$_5$ is selected from the group consisting of C$_n$H$_{2n+1}$, for n=1 to 18 (which includes, for example, CH$_3$, C$_2$H$_5$, C$_3$H$_7$, C$_4$H$_9$, C$_5$H$_{11}$, C$_6$H$_{13}$, C$_7$H$_{15}$, C$_9$H$_{19}$, C$_{10}$H$_{21}$) and phenyl, in which from 0 to 5 H within R$_5$ can be replaced by substituents selected from the group consisting of COOH, SO$_3$H, NH$_2$, succinic anhydride and their salts, or R$_5$ can be replaced by substituents selected from the group consisting of F, Cl, Br, I, OH, SH, epoxy, silicone, lower alkyl esters, lower alkyl ethers and aromatic rings; wherein optionally R$_4$ and R$_5$ can combined to form a bicyclic ring and
wherein a, b and c are the relative percentages of each comonomer repeat unit in the polymer.

Saponified polymers can also be formed, for example, from polymers of formula II:

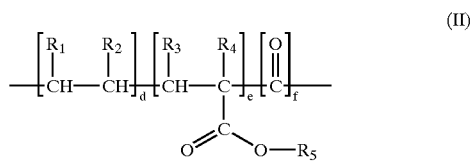
(II)

wherein:
R$_1$, R$_2$, R$_3$, R,, and R$_5$ are as defined above; and wherein d, e and f are the relative percentages of each comonomer repeat unit in the polymer; from polymers of formula III:

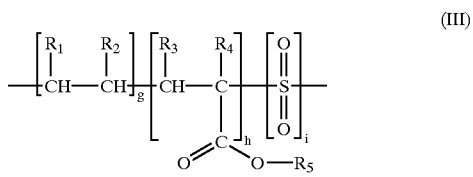
(III)

wherein:
R$_1$, R$_2$, R$_3$, R$_4$ and R$_5$ are as defined above; and wherein g, h and i are the relative percentages of each comonomer repeat unit in the polymer; and from polymers of formula IV:

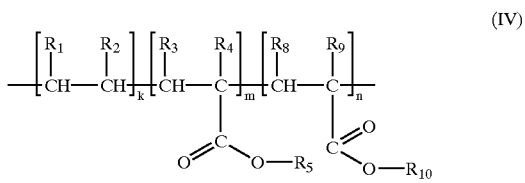
(IV)

wherein:
R$_1$, R$_2$, R$_3$, R$_4$ and R$_5$ are as defined above; R$_5$ is hydrogen, lower alkyl including C$_1$–C$_5$, carbocyclic or aromatic; R$_9$ is hydrogen or lower alkyl including C$_1$–C$_5$ and R$_{10}$ is hydrogen or is selected from the group consisting of C$_n$H$_{2n+1}$, for n=1 to 18 and phenyl, in which from 0 to 5 H within R$_{10}$ can be replaced by substituents selected from the group consisting of COOH, SO$_3$H, NH$_2$, succinic anhydride and their salts, and R$_{10}$ can be replaced by substituents selected from the group consisting of F, Cl, Br, I, OH, SH, epoxy, silicon, lower alkyl esters, lower alkyl ethers and aromatic rings and wherein k, m and n are the relative percentages of each comonomer, wherein optionally R$_9$ and R$_{10}$ can be combined to form a bicyclic ring.

In addition, saponified polymers can be formed from polymers of formula V:

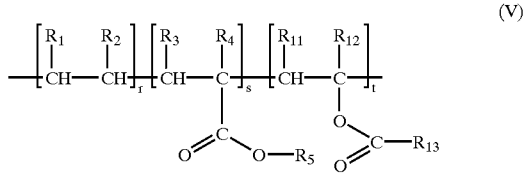

wherein:

$R_1$–$R_5$ are as defined above; $R_{11}$ is hydrogen, lower alkyl including $C_1$–$C_5$, carbocyclic or aromatic; $R_{12}$ is hydrogen or lower alkyl including $C_1$–$C_5$; wherein optionally $R_{12}$ and $R_{13}$ can be combined to form a bicyclic ring and wherein r, s and t are the relative percentages of each comonomer.

Saponified polymers can be random, block or alternating polymers and may made by blending two, three, four, five or more different monomers according to processes well known to one of ordinary skill in the art. Additionally, the subject polymers may be isotactic, syndiotactic or atactic, or any combination of these forms of types of polymers. The pendant groups creating the isotactic, syndiotactic or atactic polymers can be chosen to determine the interactions between the different polymer chains making up the resin to control the final properties of the resins used in golf ball covers. Aromatic and cyclic olefins can be used in the present invention as well as such specific groups as methyl and phenyl.

The comonomers described herein can be combined in a variety of ways to provide a final copolymer with a variety of characteristics. The letters a, d, g, k and represent numbers that can independently range from 1–99 percent, preferably from 10–95 percent, more preferably from 10–70 percent and, most preferably, from about 10–50 percent. The coefficients b, e, h, m and s can independently range from 99–1 percent, preferably from 90–5 percent, more preferably from 90–30 percent and most preferred from 90–50 percent, and c, f, i, n and t can independently range from 0 to 49 percent.

Graft copolymers of the saponified polymers described above can also be prepared for use in forming golf balls. For example, graft polymers can be produced such tat the graft segment making up the linkage between polymer chains comprises an anhydride, wherein "anhydride" is taken to mean a compound having the formula VI:

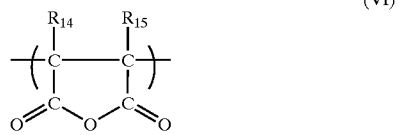

wherein:

$R_{14}$ and $R_{15}$ are the same or different and are chosen from among hydrogen, near or branched chain alkyl and substituted or unsubstituted carboxylic groups. Alternately, however, other grafting agents containing double or triple bonds can be used. Examples of these materials include, but are not limited to, acrylates and any styrene.

Grafting the polymer molecules of the present invention can be accomplished according to any technique known in the art. See, e.g., *Block and Graft Copolymers,* by R. Ceresa, pub. by Butterworths, London (1962), incorporated by reference herein. It is preferred that any grafting of the polymers of the present invention be accomplished by adding from about 1 to about 50 percent, or preferably from about 1 to about 25 percent and most preferably from about 1 to about 15 percent of a grafting agent, such as an anhydride according to Formula VI above. The grafting agents can be added either as a solid or a non-aqueous liquid, to a polymer according to the present invention. Such post reaction grafting can make the final grafted polymer more flexible.

Polymers that can be saponified for use in the present invention can be synthesized by a variety of methods, including metallocene catalysis, since it is well known in the art of polymer synthesis that many different synthetic protocols can be used to prepare a given compound.

Polymers useful for saponification preferably comprise: (1) a first monomeric component comprising an olefinic monomer having from 2 to 8 carbon atoms; (2) a second monomeric component comprising an unsaturated carboxylic acid based acrylate class ester having from 4 to 22 carbon atoms; and (3) an optional third monomeric component comprising at least one monomer selected from the group consisting of carbon monoxide, sulfur dioxide, an anhydride monomer, an unsaturated monocarboxylic acid, an olefin having from 2 to 8 carbon atoms and a vinyl ester or a vinyl ether of an alkyl having from 4 to 21 carbon atoms.

Saponified polymers are preferably prepared by adding a metal base or metal salt in the form of a solid or a solution to a polymer, such as the polymers described in the previous paragraph. When the metal base is in the form of a solid, such as a powder or a pellet, the solid preferably has an average powder particle diameter of from about 1 to about 500 microns. More preferably, such powders have an average particle diameter of 10 to 100 microns. In the case of pellets, substantially any commercially available pellet particle size can be used.

Alternatively, the metal base can be added in the form of a solution. The solution may be an aqueous solution or may be formed from at least one organic solvent, i.e., be non-aqueous. Such non-aqueous solutions typically comprise organic solvents such as alcohol, acetic acid and acetic anhydride, although other solvents may, of course, be used.

The metal base comprises at least one metal cation that will provide the ionomeric properties desired in the blend. Although virtually any metal ion that forms a base may be used in the invention, the metal base preferably comprises at least one metal cation selected from the group consisting of: Li, Na, K, Rb, Cs, Mg, Ca, Sr, Ba, Zn, La, Ti, Zr, V, Cr, Mo, W, Mn, Fe, Ru, Os, Co, Ni, Pt, Cu, Ag, B, Al, and Sn. Most preferably, the metal base comprises at least one metallic cation selected from the group consisting of: Li, Na, K, Cs, Mg, Ca, Ba, Zn, Mn, Cu, Al, and at least one anion, such as hydroxide, alkoxide, acetate, carbonate, bicarbonate, oxide, formate or nitrate.

Although other melting and mixing apparatus may be used, the polymers described herein are preferably saponified or hydrolyzed by introducing the polymer into an extruder inlet zone and melting and mixing the polymer in the inlet zone; passing the molten polymer through an addition zone within the extruder downstream from the inlet zone; and adding a metal base into the molten polymer as it passes through the addition zone.

In particular, the metal base is mixed with the polymer under non-saponification conditions. Instead of simultaneously mixing and saponifying or hydrolyzing as practiced in the prior art, these operations are carried out separately, In the first step, the polymer is heated to a substantially molten state at a temperature typically between about 50–350° C., depending upon the polymer chosen, to facilitate subsequent mixing with a metal base. This pre-heating step assures a greater degree of homogeneity in the final product and provides a final product having correspondingly improved properties.

In the next step, the metal base is added to the molten polymer and the polymer and metal base are extensively mixed under conditions in which no substantial saponification occurs. A sufficient amount of metal base must be added overall to obtain a degree of saponification of the polymer between about 1 and about 90 percent, preferably between about 1 and about 50 percent. The mixing is carried out at a temperature slightly higher than the melting temperature of the polymer. For mixing on an extruder, the screw speed can be varied between about 20–500 rpm, depending upon the material's viscosity. Furthermore, as would be well understood by one of ordinary skill in the art, the depth of the conveying element of the extruder is chosen to prevent substantial saponification of the material during mixing.

Alternately, the mixing may be accomplished using a roll mill. In such a case, the cylinder roll speed is adjusted to between about 5–100 rpm depending upon the viscosity of the material. Additionally, the mill gap is adjusted as necessary to control the amount of shear and, thus, the degree of saponification. The metal base may be added all at once to the molten polymer, or alternately it may be introduced in batches or stages.

In a third step, conditions are provided such that a saponification or hydrolysis reaction occurs between the polymer and the metal base. Saponification is achieved by continuous mixing of the polymer and base at an elevated temperature, which is substantially higher than the melting point temperature. The extent of saponification is determined by methods well known to those of ordinary skill in the art, for example, by the melt index of the partially saponified polymer or by titrating versus an acid.

The process of the present invention offers several improvements over the methods disclosed in the prior art. First, it provides for greater ease of mixing of the reactants before the reaction begins. Because the melt viscosity of the non-salt polymer is much lower than the salt polymer form, the melt mixing of the polymer and metal base is more readily carried out with lower input power requirements. Additionally, mixing of polymer and metal base is more uniform because there are no substantially saponified or hydrolyzed regions of high melt viscosity present within regions that have not yet reacted and, therefore, have low melt viscosity. Furthermore, the degree of mixing or dispersion of the base in the polymer is more easily controlled since melt viscosity is more uniform throughout the volume of molten polymer.

The process of the present invention is preferably accomplished using a twin screw extruder wherein the twin screw extruder comprises melting, addition and mixing zone means. The process can further be accomplished using a master batch comprising a concentrated amount of metal base in a polymer, with the same or different composition as the polymer introduced into the inlet zone, wherein the master batch is added from a side-stream extruder. The side-stream extruder can be a twin screw extruder comprising melting, addition and mixing zone means.

Alternatively, the continuous process of saponifying or hydrolyzing the polymers useful in the invention comprises introducing the polymer into an inlet zone of an extruder and melting and mixing the polymer in the inlet zone; passing the molten polymer through at least two addition zones connected in series; adding a portion of a metal base into the molten polymer as it passes through each addition zone; then passing the mixture through at least one saponification zone under conditions such that the polymer is at least partially saponified.

For use in saponified polymer/polyamide blends of the present invention, a saponified polymer can be blended with the other similar polymers, having a different metal base cation or distribution of cationic species than used to make the first saponified polymer, to yield a blend with desirable golf ball properties. Alternatively, two different saponified polymers with ionomeric character, having the same metal base cation can be blended to yield a useful blend. The two polymers can differ in their degree of saponification, degree of subsequent acidification, molecular weight, molecular weight distribution, tacticity, blockiness, etc.

Blends of polyamide polymers and ionomers have superior golf ball properties, including performance and durability. For example, as demonstrated in the examples provided in co-pending application Ser. No. 08/815,659, a compatible blend of a polyamide and an ionomer results in a golf ball cover composition which provides a higher durability, shear resistance and/or spin rate when compared to covers comprising conventionally-produced ionomers, e.g., a blend of a conventional ionomer and a high acid ionomer or a VLMI, i.e., a very low modulus ionomer.

The use of saponified ionomer in combination with polyamides provides golf balls with a lower cover, intermediate layer, and/or core hardness and better feel than prior art golf balls, thereby providing better playability. Moreover, where the saponified polymer is formed with the preferred method of the invention, the resulting blends are significantly less yellow than blends formed using prior art saponification methods. As a result, covers formed from the blends of the invention require less whitener e.g., $TiO_2$, than prior art blends.

The polyamide polymer component useful in forming the blends of this invention is a thermoplastic with repeating amide groups, commonly known as nylons. This component can be comprised of a homopolymer, a copolymer, a block copolymer or a blend of two or more variations of any or all of the above types of polyamide polymers. Additionally, polyamide present in the form of a fiber or a film is not contemplated for use in the blends of the present invention as such forms of polyamide, when present in a blend, would be inhomogeneous on a macroscopic scale, i.e., incompatible. Preferably, the polyamide polymer component is a homopolymer, a copolymer or a blend of two or more variations of either or both of these types of polyamides.

Preferred polyamide homopolymers include polyamide 4, polyamide 6, polyamide 7, polyamide 11, polyamide 12, polyamide 13, polyamide 4,6, polyamide 6,6, polyamide 6,9, polyamide 6,10, polyamide 6,12, polyamide 12,12, polyamide 13,13 and mixtures thereof. More preferred polyamide homopolymers include polyamide 6, polyamide 11, polyamide 12, polyamide 4,6, polyamide 6,6, polyamide 6,9, polyamide 6,10, polyamide 6,12 and mixtures thereof. The most preferred polyamide homopolymers are polyamide 11 and polyamide 12.

Polyamide copolymers are also useful in forming the blends of this invention. They are commonly designated by separating the symbols for the homopolymers by the symbol "/". For the purposes of this application, the component named first can be either the major or a minor component of the copolymer.

Preferred polyamide copolymers include polyamide 6/6,6, polyamide 6,6/6,10, polyamide 6/6,T wherein T represents terephthalic acid, polyamide 6/6,6/6,10 and mixtures thereof.

Block polyamide copolymers are materials which contain main-chain blocks or segments of polyamide or copolyamide separated by main-chain blocks of a different polymer. The separating polymer block may be a polyether, such as a poly(alkylene oxide). When poly(ethylene oxide) is used as the separating polymer block, this material is known commercially as PEBAX®, available from Elf Atochem S.A., GRILAMID®, available from Emser, or VESTAMID®, available from Hüls.

Although it has been previously known in the art to utilize block copoly(amide-ether)s such as PEBAX® in golf balls, the applicant has now surprisingly determined that other main-chain separating blocks can be used to replace the polyether separating block in block polyamide copolymers of the compositions and methods of the invention to give golf balls with good properties. Block polyamide copolymer compositions of the invention include main-chain separating blocks comprising polyester, polyurethane, polythioether, polythioester, α,ω-hydroxybutadiene oligomer and hydrogenated α,ω-hydroxybutadiene oligomer.

Preferred block polyamide copolymer compositions useful in the invention include those having block polyamide copolymer compositions useful in the invention include those having main-chain separating blocks comprising polyester, which are available commercially under the trade name K-FLEX® from King Industries and under the trade name the BAYTEC® MS from Bayer, and those having main-chain separating blocks comprising polyurethane, which are available commercially under the trade names ESTANE® from the B.F. Goodrich Company and PELLETHANE® from Dow Chemical, PANDEX® from the Dainippon Ink and Chemical Company (Japan) as well as α,ω-hydroxybutadiene oligomers and hydrogenated α,ω-hydroxybutadiene oligomers, wherein the degree of hydrogenation may be partial or substantially complete, which are available commercially as POLYBD® resins from Elf Atochem S.A. Block polyamide copolymers comprising mixtures of these main chain blocks are also preferred. These materials are particularly desirable because they provide an alternative to the costly block polyamide copolymers with polyether separating blocks. Typically, block polyamide copolymers have a hardness of at least 30 Shore A and a flexural modulus of at least 500 psi.

The polyamide homo and co-polymer component of this invention has a Shore D hardness of at least 50, as measured by ASTM method D-2240, a flexural modulus, as measured by ASTM method D-790, of at least 30,000 psi, preferably at least 75,000 psi to about 500,000 psi.

The saponified polymer/polyamide blends of the present invention can be prepared with or without the addition of a compatibilizer and with varying molecular architecture of blend components, such as varying molecular weight, tacticity, degrees of blockiness, etc., as is well known to those knowledgeable in the art of blending polymers.

Blending of the saponified polymer/polyamide blends is accomplished in a conventional manner using conventional equipment by methods familiar to those in the polymer blending art. For example, a two roll mill, a Banbury mixer or a single or twin-screw extruder may be used to produce a compatible blend. Preferably, when an extruder is used, the normally higher-melting polyamide component is first melted in the main extruder and the molten saponified polymer is introduced as a side-stream into a main extruder conveying molten polyamide where the two melts are intermixed to form a compatible blend. The single screw extruder may optionally have a grooved barrel wall, comprise a barrier screw or be of a shortened screw design. The twin screw extruder may be of the counter-rotating non-intermeshing, co-rotating non-intermeshing, counter-rotating fully intermeshing or co-rotating fully intermeshing type.

Good results have been obtained by mixing the comonomers or resins in a solid, pelletized form and then placing the mix into a hopper which is used to feed the heated barrel of an injection molding machine. Further mixing is accomplished by a screw in the heated barrel. The injection molding machine is used either to make preformed golf ball half-shells for compression molding about a core or for molding flowable cover stock about a core using a retractable-pin mold, as discussed in more detail below. The saponified polymer/polyamide blends of the present invention may be used alone or blended with other polymers or ionomers, according to methods well known in the art, to form compositions useful for forming golf balls.

For example, the saponified polymer/polyamide blends of the present invention may be combined with thermoplastic ionomers, such as ethylene methacrylic acid ionomers and ethylene acrylic acid ionomers and their terpolymers, which are sold commercially under the trade names SURLYN® and IOTEK® by DuPont and Exxon respectively.

The saponified polymer/polyamide blends of the present invention may also be combined with other thermoplastic polymers, including a functionalized polymer, a copolymer or a functionalized copolymer, or mixtures thereof. As used herein, a "functionalized" polymer or copolymer incorporates additional functionalities, such as acidic or basic groups, by reacting the polymer, such as polystyrene or a polystyrene copolymer including a block copolymer of polystyrene, with a functionalizing reagent, such as a carboxylic acid or sulfonic acid. Thermoplastic polymers which can be used in conjunction with the polymers of the claimed invention in golf ball compositions include but are not limited to polycarbonate; poly(phenylene oxide); imidized, amino group containing polymers; high impact polystyrene (hereafter HIPS); polysulfone; poly(phenylene sulfide); reinforced engineering plastics; polytetrafluoroethylene; nonionic olefinic homopolymers and copolymers, such as those produced by using free radical, ionic, Ziegler-Natta or metallocene or single-site non-metallocene catalysts, including but not limited to a polymer comprising an α-olefin containing from 2 to 10 carbon atoms, poly(ethylethylene), poly(heptylethylene), poly(isopentylethylene), poly(ethylene-propylene), poly(ethylene-butene), poly(ethylene-vinyl acetate) and poly(ethylene-vinyl alcohol); poly(butyl acrylate); poly(2-ethylbutyl acrylate); poly(heptyl acrylate); poly(2-methylbutyl acrylate); poly(3-methylbutyl acrylate); poly(N-octadecylacrylamide); poly(octadecyl methacrylate); poly(butoxyethylene); poly(methoxyethylene); poly(pentyloxyethylene); poly(1,1-dichloroethylene); poly(cyclopentylacetoxyethylene); poly(4-dodecylstyrene); poly(4-tetradecylstyrene); poly(oxyethylethylene); poly(oxytetramethylene); poly(oxytrimethylene); poly(oxycarbonylpentamethylene); poly(oxycarbonyl-3-methylpentamethylene); poly(a-methylstryrene); poly(ethylene terephthalate); poly(trimethylene terephthalate); poly(butylene terephthalate); poly(vinyl alcohol); poly(vinyl acetate); polysilane; poly(siloxane); poly(vinylidene fluoride); poly(methyl acrylate); poly(methyl methacrylate); acrylonitrile-butadiene-styrene copolymer (hereafter ABS); poly(urethane); and poly(urea); as well as the classes of polymers to which they belong and blends thereof.

More preferably, the other polymers that can be used in conjunction with saponified polymer/polyamide blends in golf ball layers include: (1) block copolymers of a poly (ether-ester), such as HYTREL® available from DuPont; (2) block copolymers of a poly(ether-amide), such as PEBAX® available from Elf Atochem; (3) styrene-butadiene-styrene block copolymers, such as the KRATON D® grades available from Shell Chemical; (4) styrene-(ethylene-propylene)-styrene or styrene-(ethylene-butylene)-styrene block copolymers, such as the KRATON G® series from Shell Chemical, either of the KRATON®s with maleic anhydride or sulfonic graft or functionality, such as the KRATON FD® or KRATON FG® series available from Shell Chemical; (5) olefinic copolymers, such as the ethylene-acrylate or ethylene methacrylate series available from Quantum; (6) homo and copolymers produced from non-metallocene catalysts, such as single-site catalysts; (7) ethylene-octene copolymers made from metallocene catalysts, such as the AFFINITY® or ENGAGE® series available from Dow Chemical and DuPont-Dow Elastomers; (8) ethylene-alpha olefin copolymers and terpolymers made from metallocene catalysts, such as the EXACT® series available from Exxon Chemical; (9) block poly(urethane-ester) or block poly(urethane-ether) or block poly(urethane-caprolactone), such as the ESTANE series available from BF Goodrich, the PELLETHANE® series available from Dow Chemical, ELASTOLLAN® available from BASF, DESMOPAN® and TEXIN® available from Bayer, Q-THANE® available from Morton International, and PANDEX® from Dannippon Ink and Chemical Company (Japan); (10) polyethylene glycol, such as CARBO WAX available from Union Carbide; (12) polycaprolactone; (13) polycaprolactam; (14) polyesters, such as EKTAR® available from Eastman; (15) ethylene-propylene-(diene monomer) terpolymers and their sulfonated or carboxylated derivatives and (16) thermoplastic and elastomer blends such as SANTOPRENE® from Monsanto.

The amounts of polymers used in the present invention can vary from 1 to 99 parts of the saponified polymer/polyamide blend to 99 to 1 parts of other polymers or ionomers, based on the total weight of polymers. More preferred ratios of 95 to 5 parts of the saponified polymer/polyamide blend with 5 to 95 parts of one or more other polymers. Most preferred is from about 95 to about 10 parts of the subject saponified polymer/polyamide blends and from about 5 to about 90 parts of the other polymer or ionomer. Optionally, the blends of the invention may contain from about 1 to about 20 parts of a suitable compatibilizer.

Compatible blends in accordance with the invention, comprising a saponified polymer and a polyamide polymer and optionally containing one or more of the other polymers or ionomers described above, may be thermoformed and, thus, can be either compression or injection molded to form a layer of foamed or unfoamed material in the cover, core or intermediate layer of a golf ball according to the invention. Typically, the layer has a thickness of at least 0.005 to about 0.125 inch and a Shore D hardness of at least to about 80. Where the layer is foamed, the polymer blends may be foamed during molding by any conventional foaming or blowing agent. Preferably, foamed layers incorporating a saponified polymer/polyamide blend have a flexural modulus of at least 1,000 to about 150,000 psi.

Golf balls according to the invention may incorporate cores comprising saponified polymer/polyamide blends, as well as grafted saponified polymers or polymer blends, non-grafted saponified polymers or polymer blends, polyamide polymers or polymer blends, or conventional materials. Cores comprising a blend of at least one saponified polymer and at least one polyamide polymer may be either one-piece, comprising a single piece of foamed or unfoamed saponified polymer/polyamide blend, or multi-piece, comprising a fluid, solid, or hollow core or center and one or more layers in which any of the center or at least one of the layers comprises a foamed or unfoamed blend of a saponified polymer and a polyamide polymer.

Conventional materials useful in centers, cores, or core layers of the golf balls of the invention include, but are not limited to, compositions having a base rubber, a crosslinking agent and a filler. The base rubber typically includes natural or synthetic rubbers. A preferred base rubber is 1,4-polybutadiene having a cis-structure of at least 40 percent. Natural rubber, polyisoprene rubber and/or styrene-butadiene rubber may be optionally added to the 1,4-polybutadiene. Crosslinking agents include metal salts of unsaturated $\alpha,\beta$-fatty acids, such as zinc or magnesium salts acrylic or methacrylic acid. The density adjusting filler typically includes materials such as zinc oxide, barium sulfate, silica, calcium carbonate, zinc carbonate, metallic powders and the like. Golf balls of the invention may also have conventional wound cores, where the core comprises a fluid, solid or hollow center wrapped in elastomeric windings.

Golf balls of the invention may also include at least one intermediate layer situated between the cover and the core. Preferably, the intermediate layer comprises a least one foamed or unfoamed layer that comprises a saponified polymer/polyamide blend, but may also be formed from a grafted or non-grafted saponified polymer or polymer blend, a polyamide polymer or polymer blend, or from any other suitable polymeric material having the desired properties, including, but not limited to, block copolymers of a poly (ether-ester), such as HYTREL®, available from DuPont, block copolymers of a poly(ether-amide), such as PEBAX®, available from Elf Atochem, and styrene-butadiene-styrene and styrene-(ethylene-propylene)-styrene or styrene-(ethylene-butylene)-styrene block copolymers, such as KRATON D® and KRATON G® from Shell Chemical.

Any of the cover, the core and the intermediate layer(s) may incorporate at least one layer of a foamed or unfoamed saponified polymer/polyamide blend. Moreover, the core may be a one-piece core, a multi-layer core, or a wound core, having a solid or fluid center.

Golf balls according to the invention may also incorporate cover layers comprising foamed or unfoamed saponified polymer/polyamide blends, polyamide polymers or polymer blends, or conventional materials, including balata and ionomer cover stock. Saponified polymer/polyamide blend cover layers according to the invention may be used with conventional solid or wound cores, as well as those comprising saponified polymers or polyamide polymers or polymer blends. Preferably, the cover of a golf ball according to the invention is formed from a blend comprising at least one polyamide polymer and at least one saponified polymer.

The use of a foamed saponified polymer/polyamide blend also allows the golf ball designer to adjust the density or mass distribution of the ball to adjust the angular moment of inertia and, thus, the spin rate and performance of the ball. Foamed materials also offer a potential cost savings due to the reduced use of polymeric material.

Additional components which can be added to the golf ball compositions of the present invention include, but are not limited to, UV stabilizers; light stabilizers; antioxidants; dyes; optical brighteners; white, colored and/or fluorescent pigments; violet agents; density adjusting fillers, including reactive and non-reactive fillers, such as zinc oxide, barium sulphate and tungsten carbide; softening agents; waxes; surfactants; processing aids; plasticizers, including internal and external plasticizers; impact modifiers; toughening agents; reinforcing materials and metallic powders, such as titanium, tungsten and copper powders. All of these materials, which are well known in the art, are added for their usual purpose in typical amounts, as is well known to the person of ordinary skill in the art.

In particular, nucleating agents may optionally be added to the polyamide component or to the blends of the invention. The more uniform crystalline texture produced by the added nucleating agent may result in increased flexural modulus and hardness. Nucleating agents such as finely dispersed silicas may be added in typical amounts, as is known to those with skill in the art.

Once the compatible blends are formed in the extruder or in other polymer processing equipment known in the art, conventional equipment used in the production of golf balls may be used to form the golf balls of the invention. For example, golf balls comprising cover compositions of the invention can be made by injection molding cover stock formed from the compatible saponified polymer/polyamide blends of the invention around a core or by compression molding pre-formed half-shells of the cover stock into a half-shell mold in a conventional manner.

Forming a compatible blend of two or more saponified polymers and polyamides dramatically improves the ability to control the mechanical properties of the blends, including flexural modulus and hardness. Golf balls and golf ball covers produced from incompatible polymer blends lack durability and crack or split into pieces when hit with a golf club. In contrast, the compatible blends of the invention provide golf balls and covers a having the durability and distance of ionomer covered two-piece balls and the feel and control of balata covered three-piece balls.

The present invention can be used in forming golf balls of any desired size. While "The Rules of Golf" by the USGA dictates that the size of a competition golf ball be no less than 1.680 inches in diameter, golf balls of any size can be used for leisure golf play. The preferred diameter of the golf balls is at least 1.680 inches to about 1.800 inches.

EXAMPLES

The following non-limiting examples are merely illustrative of the preferred embodiments of the present invention, and are not to be construed as limiting the invention, the scope of which is defined by the appended claims.

Golf balls having covers comprising the blend of the invention and balls having covers comprising a blend of Polyamide 12 and a saponified polymer formed with the process disclosed by Kurkov in U.S. Pat. No. 5,218,057, in which the copolymer is mixed with an aqueous solution of an inorganic alkali metal base at a temperature sufficient for saponification to take place and at which the copolymer undergoes a phase change, were formed using cores having a diameter of 1.58 inches, an Atti compression of about 87, and a coefficient of restitution at 125 ft/sec of about 0.79. The yellowness of the cover materials, i.e., the YI values, were measured using ASTM method D1925. The properties of the golf balls are provided in Table 1, where the properties of golf balls prepared in accordance with the invention are provided in Example 1, and the properties of golf balls prepared using the method of Kurkov are provided in Example 2. All amounts are in weight percent based on the total weight of the polymer blend.

TABLE 1

| Golf Ball Cover Compositions | Example 1 (wt %) | Example 2 (comparative) (wt %) |
| --- | --- | --- |
| Polyamide 12 (Elf-Atochem: Rilsan AMNO) | 42.3 | 42.3 |
| Saponified Polymer of the Invention | 34.6 | |
| Saponified polymer by Kurkov's process | | 34.6 |
| Surlyn 9320 (terpolymer of ethylene-butyl acrylate-methacrylic acid neutralized Zn ion) | 19.2 | 19.2 |
| $TiO_2$ dispersed in Polyamide-12 | 3.9 | 3.9 |
| Yellowness index (YI) | −9.5 | −15.7 |
| Cover Hardness (Shore D) | 61 | 65 |
| Coefficient of Restitution* | 0.789 | 0.790 |

*at incoming velocity of 125 ft/sec.

As readily seen from the data in Table 1, the golf balls of the invention have golf ball properties, such as coefficient of restitution, that are similar to those of golf balls comprising polyamide with prior art saponified polymers. The lower cover hardness of Example 1 suggests that the balls produced from the present invention will have better control during the short game. Moreover, the YI values, as measured using ASTM Method D1925, demonstrate that the covers of the golf balls of the invention are less yellower than covers formed from a saponified polymer saponified using the Kurkov process. The absence of a yellow color is important in typical applications of saponified copolymers, e.g., golf ball cover blends. Expensive whiteners, such as $TiO_2$, must be added to yellow cover materials to form such a blend, with more whitener need for yellower cover polymers. Furthermore, the addition of too much whitener can degrade the physical properties of the blend which, in turn, may unfavorably impact upon such important golf ball properties as velocity, resilience and durability. Therefore, whiter, i.e., less yellow, saponified copolymers are highly desirable materials for forming into golf ball blends.

While it is apparent that the invention disclosed herein is well calculated to fulfill the objects stated above, it will be appreciated that numerous modifications and embodiments may be devised by those skilled in the art. Therefore, it is intended that the appended claims cover all such modifications and embodiments that fall within the true spirit and scope of the present invention.

The contents of all patents cited herein are incorporated by reference in their entirety.

What is claimed is:

1. A golf ball having at least one layer, said layer comprising a saponified polymer/polyamide blend comprising at least one saponified polymer and at least one polyamide polymer, wherein the saponified polymer comprises:

a first olefinic, monomeric component having from 2 to 8 carbon atoms;

a second monomeric component comprising an unsaturated carboxylic acid based acrylate class ester having from 4 to 22 carbon atoms and at least one ester group, wherein at least a portion of said at least one ester group has been saponified with an inorganic metal base; and a third monomeric component selected from the group consisting of carbon monoxide, sulfur dioxide, an anhydride monomer, an unsaturated monocarboxylic acid, an olefin having from 2 to 8 carbon atoms and a vinyl ester or a vinyl ether of an alkyl acid having from 4 to 21 carbon atoms.

2. The golf ball of claim 1, wherein the golf ball has an Atti compression of at least 50 and a coefficient of restitution of at least 0.7.

3. The golf ball of claim 1, wherein the layer has a hardness of at least 15 Shore A, a flexural modulus of at least 500 psi and a specific gravity of at least 0.7.

4. The golf ball of claim 1, wherein said layer further comprises at least one density adjusting filler.

5. The golf ball of claim 4, wherein the density adjusting filler is a metallic powder.

6. The golf ball of claim 5, wherein the metallic powder is selected from the group consisting of titanium, tungsten and copper powder.

7. The golf ball of claim 4, wherein the density adjusting filler is a metallic oxide derivative.

8. The golf ball of claim 7, wherein the metallic oxide derivative is an oxide derivative selected from the group consisting of titanium, tungsten, copper and tin.

9. The golf ball of claim 1, wherein the layer has a foamed structure.

10. The golf ball according to claim 1, comprising a cover, wherein the layer forms at least a portion of the cover.

11. The golf ball of claim 10, wherein the cover layer has a hardness at least 40 Shore D to about 70 Shore D and a flexural modulus at least 10,000 to about 100,000 psi.

12. The golf ball according to claim 10, further comprising a core, wherein the layer forms at least a portion of the core.

13. The golf ball of claim 12, wherein the core layer has a hardness at least 40 Shore A to about 70 Shore D and a flexural modulus at least 500 to about 150,000 psi.

14. The golf ball of claim 12, wherein the cover has a thickness of at least 0.03 inch to about 0.125 inch and at least 60 percent dimple coverage, and a core, having a diameter of at least 0.5 to about 1.63 inches.

15. A golf ball according to claim 12, wherein the portion of the core is solid or fluid.

16. A golf ball according to claim 15, wherein the portion of the core is fluid further comprising a tensioned elastomeric material.

17. The golf ball according to claim 16, wherein the tensioned elastomeric material further comprises natural or synthetic elastomers or blends thereof.

18. The golf ball according to claim 8, further comprising at least one intermediate layer situated between the cover and the core.

19. The golf ball of claim 18, wherein the at least one intermediate layer has a hardness at least 20 Shore D to 70 Shore D and flexural modulus at least 500 to about 100,000 psi.

20. The golf ball of claim 18, wherein the intermediate layer has a thickness of at least 0.02 inches.

21. The golf ball according to claim 18, wherein the layer forms at least a portion of at least one intermediate layer.

22. The golf ball of claim 1, wherein the polyamide polymer is a copolymer selected from the group consisting of polyamide 6/6,6, polyamide 6,6/6,10, polyamide 6/6,T, polyamide 6/6,6/6,10 and mixtures thereof.

23. The golf ball of claim 1, wherein the polyamide polymer is a homopolymer selected from the group consisting of polyamide 6, polyamide 11, polyamide 12, polyamide 4,6, polyamide 6,6, polyamide 6,9, polyamide 6,10, polyamide 6,12 and mixtures thereof.

24. The golf ball of claim 23, wherein the polyamide homopolymer is selected from the group consisting of polyamide 11 and polyamide 12.

25. The golf ball of claim 1, wherein the saponified polymer of the saponified polymer/polyamide blend of said layer has a Shore D hardness of at least 15, a flexural modulus of at least 500 psi, a specific gravity of at least 0.7, a dynamic shear modulus at 23° C. of at least $10^4$ dynes/cm$^2$ and a loss tangent of no more than about 1 at 23° C.

26. The golf ball of claim 25, wherein the flexural modulus of the saponified polymer of the saponified polymer/polyamide blend is about 1000 psi to about 100,000 psi.

27. The golf ball of claim 25, wherein the specific gravity of the saponified polymer of the saponified polymer/polyamide blend is at least 0.75 to about 1.

28. The golf ball of claim 25, wherein the dynamic shear storage modulus of the saponified polymer of the saponified polymer/polyamide blend is about $10^6$ to about $10^{10}$ dynes/cm$^2$.

29. The golf ball of claim 25, wherein the loss tangent of the saponified polymer of the saponified polymer/polyamide blend is no more than 0.1 at 23° C.

30. The golf ball according to claim 1, wherein the third monomeric component is present in an amount of about 49 percent or less by weight of the total polymer weight.

31. The golf ball according to claim 1, wherein the metal base comprises at least one metallic cation, selected from the group consisting of lithium, sodium, potassium, cesium, magnesium, calcium, barium, manganese, copper, zinc and aluminum and at least one anion, selected from the group consisting of hydroxide, alkoxide, acetate, carbonate, bicarbonate, oxide, formate and nitrate.

32. The golf ball according to claim 1, wherein the first monomeric component comprises an α-olefin monomer having a terminal point of unsaturation.

33. The golf ball according to claim 1, wherein the first monomeric component has a formula:

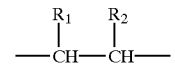

wherein:
$R_1$ is hydrogen or an alkyl group; and
$R_2$ is hydrogen, lower alkyl including $C_1$–$C_5$, carbocyclic or aromatic.

34. The golf ball according to claim 32, wherein the first monomeric component is ethylene.

35. The golf ball according to claim 1, wherein the first monomeric component comprises from about 10 to about 95 percent by weight of the total polymer weight.

36. The golf ball according to claim 35, wherein the first monomeric component comprises from about 10 to about 70 percent by weight of the total polymer weight.

37. The golf ball according to claim 1, wherein the second monomeric component is an unsaturated acrylate class ester having a formula:

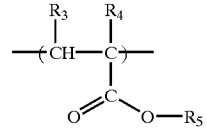

wherein:
$R_3$ is hydrogen or an alkyl group;
$R_4$ is hydrogen, lower alkyl including $C_1$–$C_5$, carbocyclic or aromatic; and
$R_5$ is selected from the group consisting of $C_nH_{2n+1}$, for n=1 to 18 and phenyl, in which from 0 to 5 H within $R_5$ can be replaced by substituents selected from the group consisting of COOH, SO$_3$H, NH$_2$, succinic anhydride and their salts, or R₅ can be replaced by substituents selected from the group consisting of F, Cl, Br, I, OH, SH, epoxy, silicone, lower alkyl esters, lower alkyl ethers and aromatic rings, wherein optionally R₄ and R₅ can be combined to form a bicyclic ring.

38. The golf ball according to claim 1, wherein the second monomeric component comprises from about 90 to about 5 percent by weight of the total polymer weight.

39. The golf ball according to claim 38, wherein the second monomeric component comprises from about 90 to about 30 percent by weight of the total polymer weight.

40. The golf ball according to claim 1, wherein a grafting agent has been added to at least one of the saponified polymer or the polyamide to form a grafted polymer.

41. The golf ball according to claim 40, wherein the grafting agent comprises an anhydride having a formula:

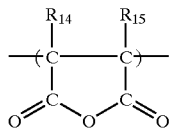

wherein:
R₁₄ and R₁₅ are the same or different and are selected from the group consisting of hydrogen, linear or branched chain alkyl and substituted or unsubstituted carboxylic groups.

42. The golf ball according to claim 40, wherein the grafting agent is added in an amount of between about 1 to about 50 percent by weight of the polymer.

43. The golf ball according to claim 42, wherein the grafting agent is added in an amount of between about 1 to about 15 percent by weight of the polymer.

44. The golf ball of claim 1, wherein the saponified polymer/polyamide blend further comprises at least one compatibilizer.

45. The golf ball of claim 44, wherein the compatibilizer is selected from the group consisting of olefinic block, random, and graft thermoplastic polymers and oligomers, which contain monomers and comonomers functionalized with groups selected from the group consisting of acids, esters, epoxies, isocyanates, hydroxys, anhydrides, amines, thiols; polyester-polyether block copolymers; polyamide-polyether block copolymers; polysiloxanes; silicones; styrene-butadiene and hydrogenated styrene-butadiene block co-polymers; and mixtures thereof.

46. The golf ball of claim 44, wherein the compatibilizer is up to about 20 parts, based on 100 parts by weight of the saponified polymer/polyamide blend.

47. A golf ball comprising a cover layer, a core layer and at least one intermediate layer situated between the cover layer and the core layer, wherein at least one of said layers comprises a blend of at least one saponified polymer and at least one polyamide polymer, wherein the polyamide polymer is selected from the group consisting of polyamide 6, polyamide 11, polyamide 12, polyamide 4,6, polyamide 6,6, polyamide 6,9, polyamide 6,10, polyamide 6,12, polyamide 6/6,6, polyamide 6,6/6,10 polyamide 6/6,T, polyamide 6/6, 6/6,10, and mixtures thereof.

48. The golf ball of claim 47, wherein the cover layer comprises the blend.

49. The golf ball of claim 47, wherein the intermediate layer comprises the blend.

50. A golf ball having at least one layer, said layer comprising a saponified polymer/polyamide blend comprising from about 1 to about 99 parts of at least one saponified polymer and from about 99 to about 1 parts of at least one polyamide polymer, based on 100 parts by weight of the saponified polymer/polyamide blend, wherein the polyamide polymer is selected from the group consisting of polyamide 6, polyamide 11, polyamide 12, polyamide 4,6, polyamide 6,6, polyamide 6,9, polyamide 6,10, polyamide 6,12, polyamide 6/6,6, polyamide 6,6/6,10, polyamide 6/6,T, polyamide 6/6,6/6,10 and mixtures thereof.

51. The golf ball according to claim 50, wherein the saponified polymer/polyamide blend further comprises at least one compatibilizer selected from the group consisting of olefinic block, random, and graft thermoplastic polymers and oligomers, which contain monomers and comonomers functionalized with groups selected from the group consisting of acids, esters, epoxies, isocyanates, hydroxys, anhydrides, amines, thiols; polyester-polyether block copolymers; polyamide-polyether block copolymers; polysiloxanes; silicones; styrene-butadiene and hydrogenated styrene-butadiene block co-polymers; and mixtures thereof.

52. The golf ball of claim 50, wherein the golf ball has an Atti compression of at least 50 and a coefficient of restitution of at least 0.7.

53. The golf ball of claim 50, wherein said layer has a hardness of at least 15 Shore A, a flexural modulus of at least 500 psi and a specific gravity of at least 0.7.

54. The golf ball of claim 50, wherein said layer further comprises at least one density adjusting filler selected from the group consisting of titanium, tungsten and copper powder.

55. The golf ball of claim 50, wherein said layer has a foamed structure.

56. The golf ball of claim 50, wherein said saponified polymer of the saponified polymer/polyamide blend of said layer has a Shore D hardness of at least 15, a flexural modulus of at least 500 psi, a specific gravity of at least 0.7, a dynamic shear modulus at 23° C. of at least 104 dynes/cm2 and a loss tangent of no more than about 1 at 23° C.

57. The golf ball according to claim 50, wherein the saponified polymer comprises a first olefinic, monomeric component having from 2 to 8 carbon atoms and a second monomeric component comprising an unsaturated carboxylic acid based acrylate class ester having from 4 to 22 carbon atoms and at least one ester group, wherein at least a portion of said at least one ester group has been saponified with an inorganic metal base.

58. The golf ball according to claim 50, further comprising a third monomeric component selected from the group consisting of carbon monoxide, sulfur dioxide, an anhydride monomer, an unsaturated monocarboxylic acid, an olefin having from 2 to 8 carbon atoms and a vinyl ester or a vinyl ether of an alkyl acid having from 4 to 21 carbon atoms.

59. The golf ball according to claim 50, wherein a grafting agent has been added to at least one of the saponified polymer or the polyamide to form a grafted polymer.

* * * * *